United States Patent
Lee et al.

(10) Patent No.: US 7,496,468 B2
(45) Date of Patent: Feb. 24, 2009

(54) APPARATUS FOR DETERMINING A NUMBER OF DATA TRANSMISSIONS IN SENSOR NETWORK AND METHOD USING THE SAME

(75) Inventors: Jin Wook Lee, Yongin-si (KR); Hun Lim, Yongin-si (KR); Sun Shin An, Seoul (KR); Won Keun Kong, Suwon-si (KR); Su Myeon Kim, Suwon-si (KR); Kyung Soo Lim, Seoul (KR); Sang Bin Lee, Seoul (KR)

(73) Assignees: Samsung Electronics Co., Ltd. (KR); Korea University Industrial & Academic Collaboration Foundation (KR)

( * ) Notice: Subject to any disclaimer, the term of this patent is extended or adjusted under 35 U.S.C. 154(b) by 0 days.

(21) Appl. No.: 11/819,828

(22) Filed: Jun. 29, 2007

(65) Prior Publication Data
US 2008/0183417 A1  Jul. 31, 2008

(30) Foreign Application Priority Data
Jan. 30, 2007   (KR) ...................... 10-2007-0009459

(51) Int. Cl.
  *G08C 15/00*  (2006.01)
  *G06F 11/00*  (2006.01)
(52) U.S. Cl. ...................... 702/127; 702/179; 702/187; 370/232
(58) Field of Classification Search ................. 702/127, 702/179, 187
See application file for complete search history.

(56) References Cited

U.S. PATENT DOCUMENTS

| | | | | |
|---|---|---|---|---|
| 5,850,625 | A | * | 12/1998 | Maren et al. ................... 702/93 |
| 5,940,778 | A | * | 8/1999 | Marfurt et al. ................ 702/16 |
| 6,889,171 | B2 | * | 5/2005 | Skrbina et al. .............. 702/187 |
| 2006/0142978 | A1 | | 6/2006 | Suenbuel et al. ............... 703/1 |
| 2007/0198222 | A1 | * | 8/2007 | Schuster et al. ............. 702/187 |

FOREIGN PATENT DOCUMENTS

| | | |
|---|---|---|
| JP | 2004-343534 | 12/2004 |
| JP | 2005-260697 | 9/2005 |
| JP | 2006-074536 | 3/2006 |
| KR | 2006-0058975 A | 6/2006 |

OTHER PUBLICATIONS

Sagnik Bhattacharya et al.; "Energy-Conserving Data Placement and Asynchronous Multicast in Wireless Sensor Networks"; Department of Computer Science; pp. 1-13.

* cited by examiner

*Primary Examiner*—Hal D Wachsman
(74) *Attorney, Agent, or Firm*—McNeely Bodendorf LLP

(57) ABSTRACT

An apparatus and method of determining a number of data transmissions in a sensor network are provided. More particularly, an apparatus for determining a number of data transmissions preferably includes an interest zone detector for detecting an interest zone based on a user query, a zone determination unit for determining whether the interest zone is overlapped with a sensing zone, a zone calculator for calculating an overlap amount when the interest zone is overlapped with the sensing zone, and a transmission number determination unit for determining a number of data transmissions according to the overlap amount.

21 Claims, 9 Drawing Sheets

$r_1 + r_2 < d$ $r_1 + r_2 = d$ $r_1 - r_2 = d$ $r_1 - r_2 > d$ $r_1 - r_2 < d < r_1 + r_2$

APPARATUS FOR DETERMINING A NUMBER OF DATA TRANSMISSIONS IN SENSOR NETWORK AND METHOD USING THE SAME

CROSS-REFERENCE TO RELATED APPLICATIONS

This application claims the benefit under 35 U.S.C. § 119(a) of a Korean Patent Application No. 10-2007-0009459, filed on Jan. 30, 2007, in the Korean Intellectual Property Office, the entire disclosure of which is hereby incorporated by reference.

BACKGROUND OF THE INVENTION

1. Field of the Invention

The present invention relates to a method and apparatus for determining a number of data transmissions. More particularly, the present invention relates to a method and apparatus for determining a number of data transmissions to transmit data in a sensor network.

2. Description of Related Art

A sensor network includes sensor nodes and cluster nodes. The sensor nodes may sense a temperature, humidity, an illumination intensity, and the like, and the cluster nodes may receive data from the sensor nodes and transmit the data to another node. A cluster node comprises communications components and a processing unit to communicate with other nodes. A sensor node is similar to a cluster node but also comprises a sensing component.

In this instance, when data is transmitted between the sensor nodes, the sensor network may include only the sensor nodes.

A conventional sensor node transmits sensed data to a cluster node at predetermined transmission periods. Also, the cluster node receives data from sensor nodes and the other cluster nodes and transmits the received data to another cluster node at predetermined transmission periods.

The sensor node and the cluster node utilize a battery as a power source. Accordingly, in the sensor node and the cluster node, it is vitally important to extend a battery duration time.

However, in the conventional sensor node and the cluster node, the data transmission is performed at predetermined transmission periods regardless of periodicity and similarity of data to be transmitted. Accordingly, unnecessary data transmission may occur and power may thereby be unnecessarily consumed.

Accordingly, there is a need for an apparatus for reducing a number of unnecessary data transmissions and thereby reducing power consumption in a sensor network.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to reduce a number of unnecessary data transmissions in a node and thereby reduce unnecessary power consumption by the node.

Another aspect of exemplary embodiments of the present invention is to reduce a number of unnecessary data transmissions in a node and thereby reduce a total number of data transmissions in a sensor network.

Another aspect of exemplary embodiments of the present invention is to aggregate only data of nodes having a sensing zone overlapped with a user interest zone.

Another aspect of exemplary embodiments of the present invention is to simply compare geographical codes and thereby determine whether a sensing zone is overlapped with a user interest zone.

According to an aspect of exemplary embodiments of the present invention, there is provided an apparatus for determining a number of data transmissions in a sensor network, the apparatus preferably including an interest zone detector for detecting an interest zone based on a user query, a zone determination unit for determining whether the interest zone is overlapped with a sensing zone, a zone calculator for calculating an overlap amount when the interest zone is overlapped with the sensing zone, and a transmission number determination unit for determining a number of data transmissions according to the overlap amount.

In an exemplary implementation of the present invention, the zone determination unit may determine whether the interest zone is overlapped with the sensing zone based on a geographical code comprising a sensing location and a sensing range, and another geographical code comprising an interest location and an interest range that are provided in the user query.

In an exemplary implementation of the present invention, the zone determination unit may determine whether the interest zone is overlapped with the sensing zone by using a radius of the interest zone, a radius of the sensing zone, and a distance between the sensing location and the interest location.

In an exemplary implementation of the present invention, the zone calculator may calculate the area ratio of the interest zone to an overlapping area between the interest zone and the sensing zone.

In an exemplary implementation of the present invention, the transmission number determination unit may determine the number of data transmissions by $$T_n = \frac{S'}{S} \times \frac{UIT}{P_t}$$

where Tn indicates the number of data transmission, S' indicates an overlapping area between the interest zone and the sensing zone, S indicates an area of the interest zone, UIT indicates a user interest time comprised in the user query, and Pt indicates a data transmission period.

In an exemplary implementation of the present invention, the apparatus may further include a data aggregator for aggregating data received from at least one node, wherein the data number transmission unit may determine the aggregated number of data transmissions.

In an exemplary implementation of the present invention, the apparatus may further include a data selector for selecting data received from other nodes, from the data received from the at least one node, the other nodes having the sensing zone overlapped with the interest zone, wherein the data aggregator may aggregate the selected data.

According to another aspect of exemplary embodiments of the present invention, there is provided a method of determining a number of data transmissions, the method including detecting an interest zone based on a user query, determining whether the interest zone is overlapped with a sensing zone, calculating an overlap amount when the interest zone is overlapped with the sensing zone, and determining a number of data transmissions according to the overlap amount.

In an exemplary implementation of the present invention, the method further includes aggregating data received from at least one different node, wherein the determining of the number of data transmissions may include determining the aggregated number of data transmissions.

In an exemplary implementation of the present invention, the method further includes selecting data, received from other nodes, from among the data received from the at least one node, the other nodes having the sensing zone overlapped with the interest zone, wherein the aggregating may aggregate the selected data.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF THE EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
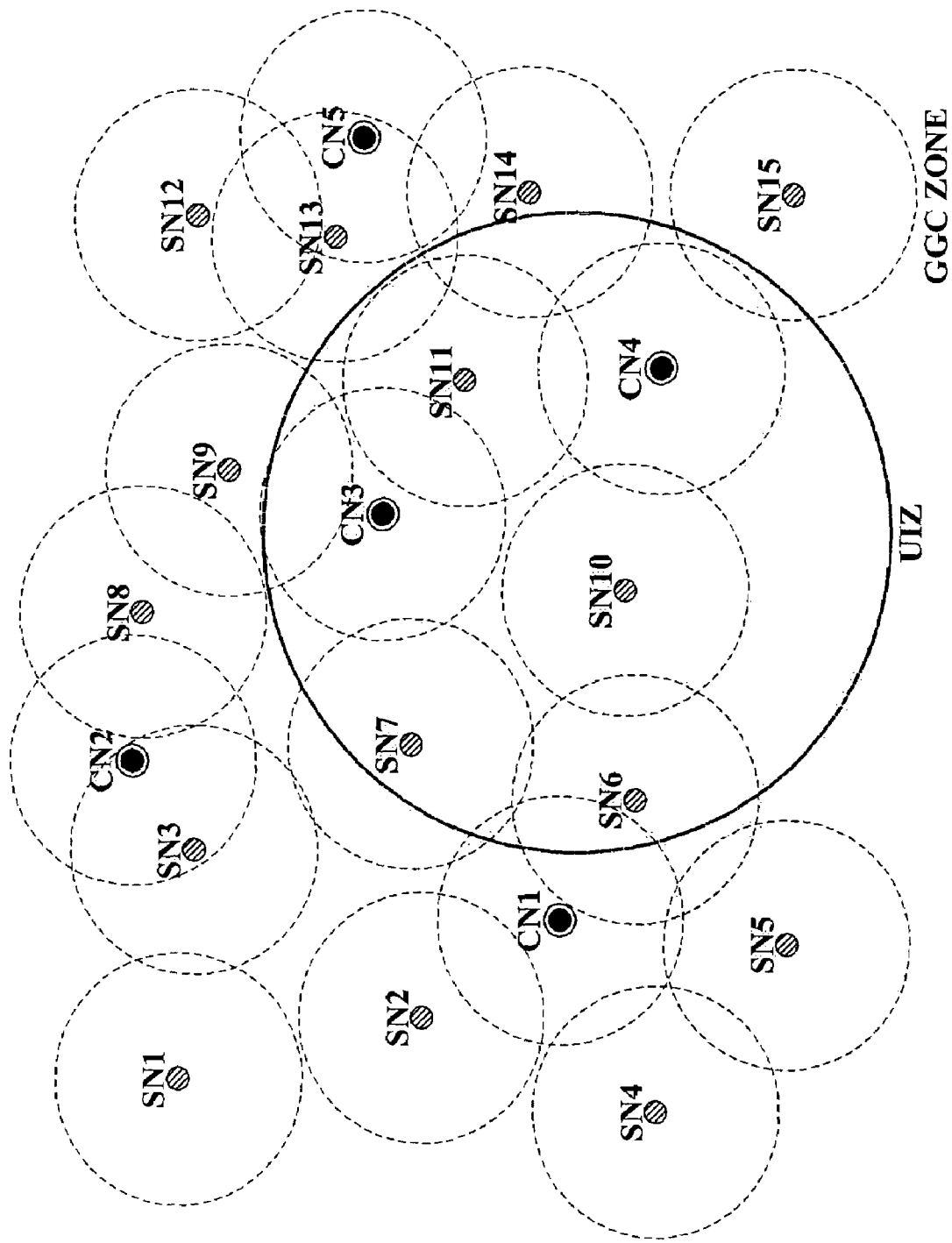
FIG. 1 illustrates an example of a sensor network for describing an exemplary embodiment of the present invention.

FIG. 1 illustrates an example of a sensor network for describing an exemplary embodiment of the present invention.

Referring to FIG. 1, the sensor network includes a plurality of sensor nodes SN1, SN2, SN3, SN4, SN5, SN6, SN7, SN8, SN9, SN10, SN11, SN12, SN13, SN14, and SN15, and a plurality of cluster nodes CN1, CN2, CN3, CN4, and CN5.

In an exemplary implementation of the present invention, a sensor node SN includes a geographical code (GGC) which indicates a sensing zone of the sensor node and includes a sensing location and a sensing range. Also, the sensor node senses data, for example, temperature, humidity, illumination intensity, and the like, in the sensing zone of the sensor node.

Also, the sensor node may transmit the sensed data to a corresponding cluster node.

Also, the sensor node may aggregate data received from other sensor nodes and transmit the aggregated data to a corresponding cluster node or another sensor node. In this instance, the sensor node preferably transmits the data to the other sensor node according to a predetermined topology.

Also, the sensor node may receive a user query, compare a GGC indicating a user interest zone (UIZ) contained in the user query with another GGC indicating the sensing zone, and thereby determine whether the UIZ is overlapped with the sensing zone.

In an exemplary implementation of the present invention, the user query includes the UIZ and a user interest time (UIT), and the UIZ includes an interest location and an interest range.

Also, the sensor node may determine a number of data transmissions during the UIT, based on an overlapping area between the UIZ and the sensing zone, and an area of the UIZ.

Also, the sensor node may transmit the sensed data or the aggregated data to the other sensor node or a cluster node by the determined number of data transmissions during the UIT.

The cluster node aggregates data received from sensor nodes and the other cluster node, and transmits the aggregated data to another cluster node. For example, the cluster node CN2 receives data from sensor nodes which transmit the data to the cluster node CN2, and data from the other cluster node CN1, aggregates the data, and transmits the aggregated data to another cluster node CN3.

Also, the cluster node may aggregate only data of sensor nodes having a sensing zone overlapped with the UIZ, among the received data, and transmit the aggregated data to the other cluster node.

Also, the cluster node may include a GGC including a location and range of the cluster node, and determine whether a GGC zone of the cluster node is overlapped with the UIZ.

Also, when the GGC zone of the cluster node is overlapped with the UIZ, the cluster node may determine a number of data transmissions during the UIT based on a UIZ area and an overlapping area between the GGC zone and the UIZ.

Specifically, the sensor node and the cluster node may determine whether a GGC zone of each node is overlapped with the UIZ, and determine the number of data transmissions based on the overlapping area and the UIZ area when the GGC zone is overlapped with the UIZ. Accordingly, it is possible to reduce an unnecessary data transmission and unnecessary power consumption in a node and thereby increase a battery life.

Although the sensor node shown in FIG. 1 includes the plurality of sensor nodes and the plurality of cluster nodes, the present invention is not limited thereto. Specifically, the sensor network may include only the plurality of sensor nodes.

When data transmission between sensor nodes is performed according to a predetermined topology, a number of data transmissions is determined based on an overlapping area of each of the sensor nodes and the UIZ area, with respect to data transmission between sensor nodes having an overlapping area between the UIZ and the GGC zone.

Each of the sensor nodes having a sensing zone overlapped with the UIZ aggregates data received from the other sensor nodes, and transmits the aggregated data to another sensor node by the determined number of data transmissions during the UIT.

Figure 2:
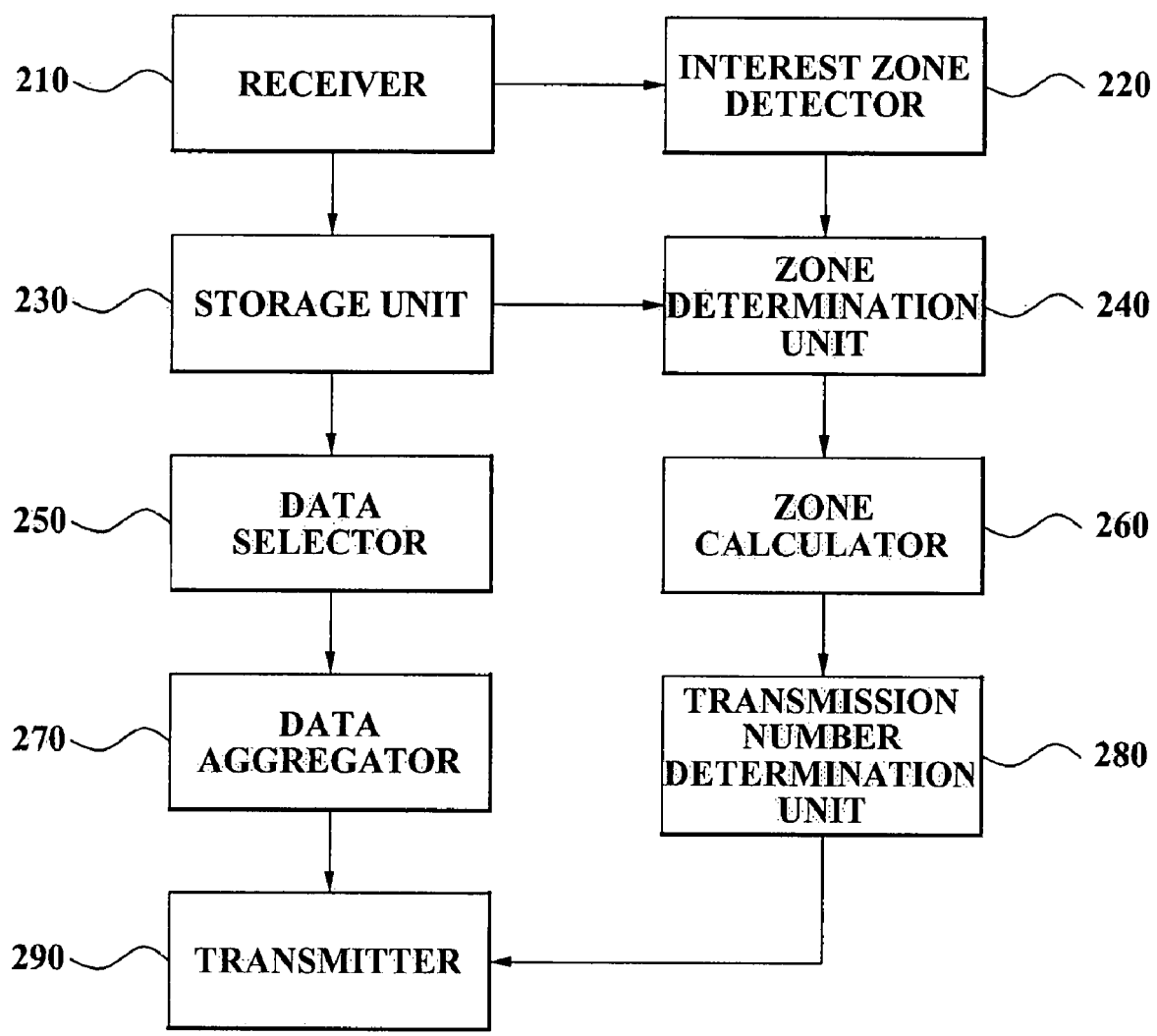
FIG. 2 is a block diagram illustrating a configuration of an apparatus for determining a number of data transmissions according to an exemplary embodiment of the present invention.

FIG. 2 is a block diagram illustrating a configuration of an apparatus for determining a number of data transmissions according to an exemplary embodiment of the present invention.

Referring to FIG. 2, the apparatus includes a receiver 210, an interest zone detector 220, a storage unit 230, a zone determination unit 240, a data selector 250, a zone calculator 260, a data aggregator 270, a transmission number determination unit 280, and a transmitter 290.

The receiver 210 preferably receives data from other nodes. Also, the receiver 210 may receive a user query.

In this instance, the received data includes a GGC of a node which transmits the data.

The storage unit 230 stores the data received from other nodes. Also, the storage unit 230 may store a GGC of a node including the apparatus for determining the number of data transmissions, and the node may sense a sensing zone based on the stored GGC.

Also, the storage unit 230 may store data sensed in the sensing zone and node-related programs.

The interest zone detector 220 detects a UIZ based on the user query received from the receiver 210.

Specifically, the interest zone detector 220 detects the UIZ based on the GGC included in the user query.

In this instance, the UIZ may include an interest location and an interest range.

The zone determination unit 240 determines whether the UIZ detected from the interest zone detector 220 is overlapped with the GGC of the node, that is, a sensing zone of the node.

In an exemplary implementation of the present invention, the zone determination unit 240 may determine whether the UIZ is overlapped with the sensing zone based on the GGC of the node including the sensing location and the sensing range, and the GGC of the UIZ including an interest location and an interest range.

Also, the zone determination unit 240 may determine whether the UIZ is overlapped with the sensing zone by using a radius of the UIZ, a radius of the sensing zone, and a distance between the sensing location and the interest location.

Specifically, the zone determination unit 240 may determine whether the UIZ is overlapped with the sensing zone by, $$\begin{cases} r_1 + r_2 < d \\ r_1 + r_2 = d \\ r_1 - r_2 < d < r_1 + r_2 \\ r_1 - r_2 = d \\ r_1 - r_2 > d \end{cases} \quad \text{[Equation 1]}$$

$$d = \sqrt{(x_1 - x_2)^2 + (y_1 - y_2)^2}$$

where (x1, y1) indicates the interest location, r1 indicates the radius of the UIZ, (x2, y2) indicates a node location, r2 indicates the radius of the sensing zone, and d indicates the distance between the sensing location and the interest location.

Figure 3A:
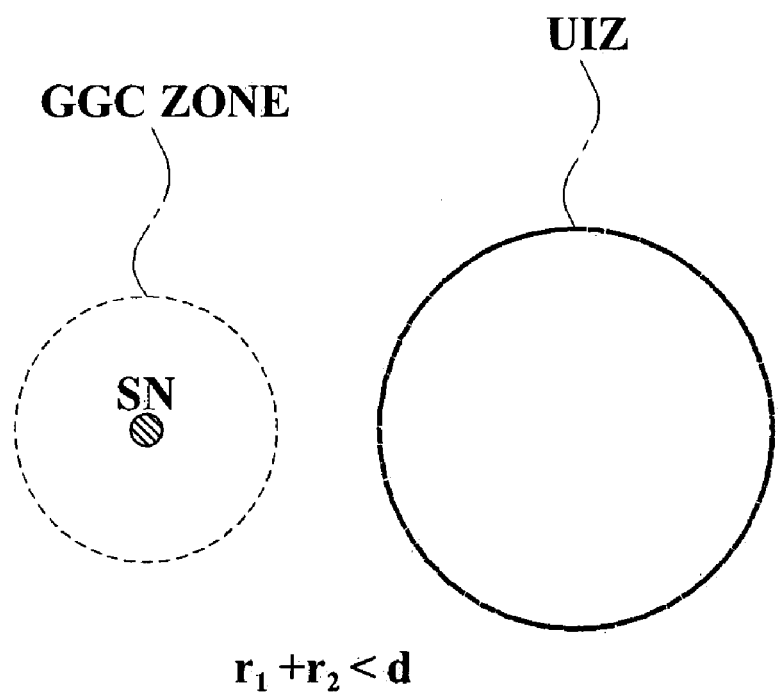
FIGS. 3A, 3B, 3C, 3D, and 3E illustrate examples of inclusion relationships between a user interest zone (UIZ) and a sensing zone according to an exemplary embodiment of the present invention.
Figure 3B:
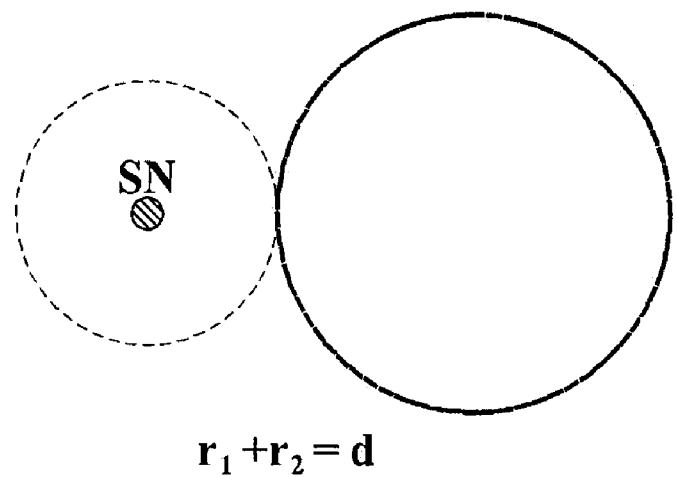
Figure 3C:
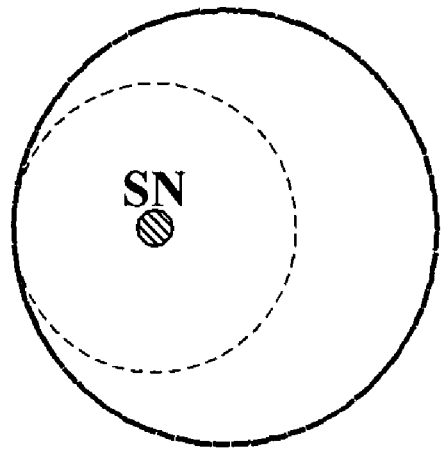
Figure 3D:
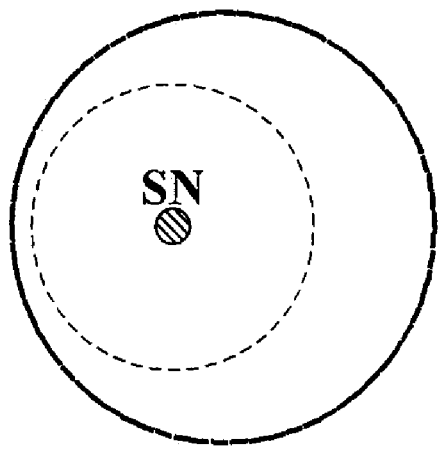
Figure 3E:
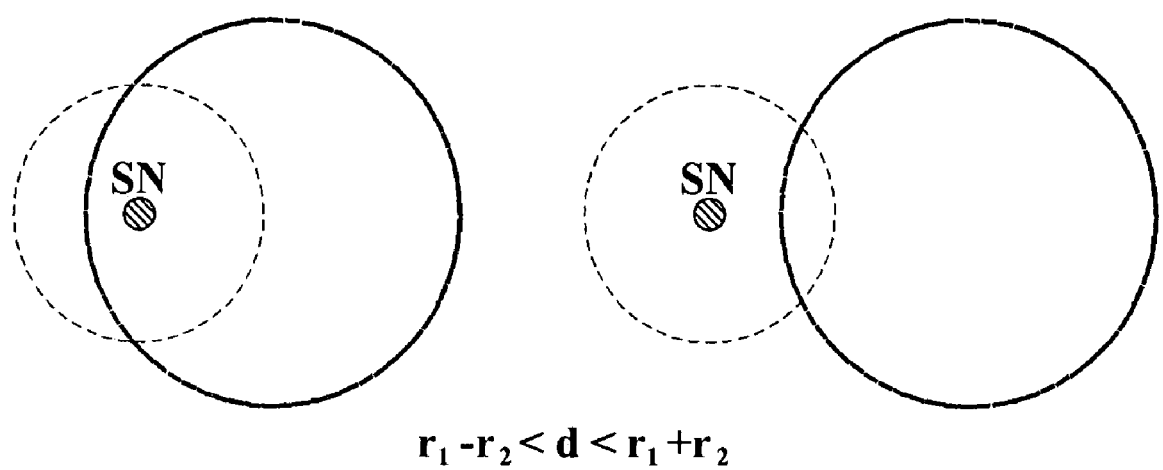

Specifically, as shown in FIG. 3A, as a result of the determination, when r1+r2<d, the zone determination unit 240 determines that the sensing zone is separated from the UIZ. Also, when r1+r2=d (FIG. 3B), the zone determination unit 240 determines that the sensing zone is circumscribed with the UIZ. Also, when r1−r2<d<r1+r2 (FIG. 3E), the zone determination unit 240 determines that the sensing zone is overlapped with the UIZ. Also, when r1−r2=d (FIG. 3C), the zone determination unit 240 determines that the sensing zone is inscribed in the UIZ. Also, when r1−r2>d (FIG. 3D), the zone determination unit 240 determines that the UIZ contains the sensing zone.

Accordingly, when r1−r2<d<r1+r2 (FIG. 3E), and when r1−r2≧d (FIG. 3C), the zone determination unit 240 determines that the UIZ is overlapped with the sensing zone.

The zone calculator 260 calculates an overlap amount when the UIZ is overlapped with the sensing zone.

Specifically, the zone calculator 260 calculates the ratio of the UIZ area to the overlapping area between the UIZ and the sensing zone.

For example, when the sensing zone is inscribed in the UIZ or contained in the UIZ, the zone calculator 260 calculates the ratio of the UIZ area to an area of the sensing zone, and calculates the ratio of the UIZ area to the overlapping area when the sensing zone is partially overlapped with the UIZ.

When the sensing zone is partially overlapped with the UIZ, the overlapping area may be calculated by $$S' = \frac{r_1 \cos^{-1}\left(\frac{r_1^2 - r_2^2 + d^2}{2 r_1 d}\right) + r_2 \cos^{-1}\left(\frac{d - \frac{r_1^2 - r_2^2 + d^2}{2d}}{r_2}\right)}{2} - d\sqrt{r_1^2 - \left(\frac{r_1^2 - r_2^2 + d^2}{2d}\right)^2} \quad \text{[Equation 2]}$$

where S' indicates the overlapping area between the UIZ and the sensing zone, r1 indicates the radius of the UIZ, r2 indicates the radius of the sensing zone and d indicates the distance between the sensing location and the interest location.

The transmission number determination unit 280 determines the number of data transmissions based on the overlap amount calculated by the zone calculator 260.

The transmission number determination unit 280 may determine the number of data transmissions by $$T_n = \frac{S'}{S} \times \frac{UIT}{P_t} \quad \text{[Equation 3]}$$

where Tn indicates the number of data transmission, S' indicates the overlapping area between the UIZ and the sensing zone, S indicates an area of the UIZ, UIT indicates a user interest time included in the user query, and Pt indicates a data transmission period.

For example, when the overlapping area is 20% with respect to the UIZ area, the UIT is 60 seconds, and the data transmission period is five seconds, the data transmission number determination unit 280 calculates the number of data transmissions, Tn=0.2×60/5=2.4. Specifically, the number of data transmissions of the node is twice, instead of twelve times.

The data selector 250 selects data of nodes, having an overlapping zone with the UIZ, from data received from other nodes.

Specifically, the data selector 250 preferably selects only data of a zone corresponding to the UIZ.

In an exemplary implementation, the data selected by the data selector 250 may include data sensed by a node including the apparatus for determining the number of data transmissions.

The data aggregator 270 aggregates the data selected by the data selector 250.

The transmitter 290 transmits the data, aggregated by the data aggregator 270, by the number of data transmissions, determined by the transmission number determination unit 280, during the UIT included in the user query.

Also, the transmitter 290 may transmit the aggregated data to any one of a sensor node, a cluster node, and an access node.

The access node indicates a node connected to a wired network or an Internet network.

As described above, the apparatus for determining the number of data transmissions according to the present exemplary embodiment may determine the number of data transmissions based on the overlapping area between the UIZ and the sensing zone. Accordingly, it is possible to reduce unnecessary power consumption in a node while maintaining reliability with respect to data of the UIZ.

An operation of an apparatus for determining a number of data transmissions according to an exemplary embodiment of the present invention will be described with reference to FIGS. 4 and 5.

Figure 4:
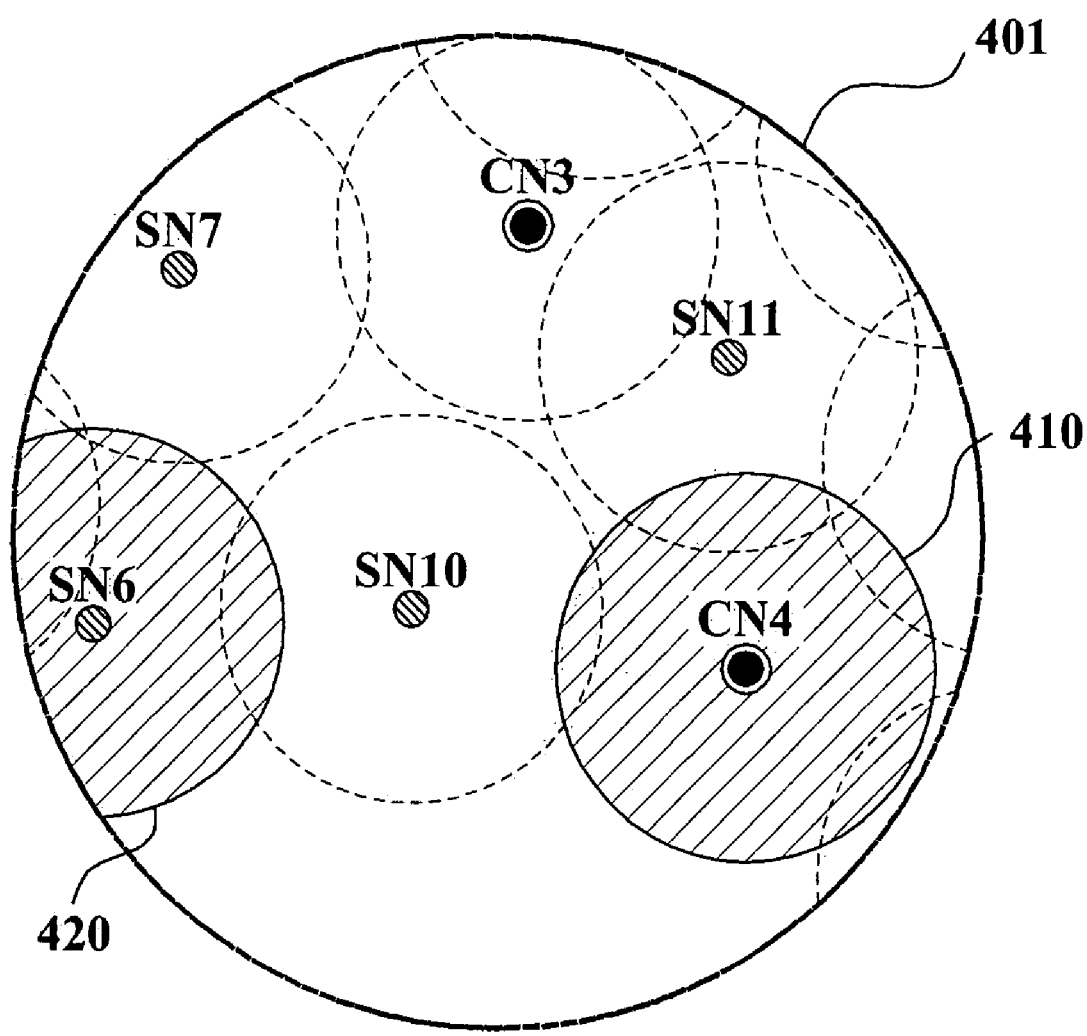
FIG. 4 illustrates an example of a sensing zone which is overlapped with a UIZ in a sensor network of FIG. 1.

FIG. 4 illustrates an example of a sensing zone which is overlapped with a UIZ in the sensor network shown in FIG. 1.

As shown in FIG. 4, a sensing zone, that is, a GGC zone, of sensor nodes SN10 and SN11, and a cluster node CN4 is contained in the UIZ 401 or inscribed in the UIZ. Also, upon comparing FIG. 1 and FIG. 4, it can be seen that a sensing zone of a cluster node CN1 and CN3 and sensor nodes SN6, SN7, SN9, SN13, SN14 and SN15 are partially overlapped with the UIZ as indicated by their respective partial hashed circles.

Hereinafter, an exemplary embodiment of the present invention will be described by using the cluster node CN4 having the sensing zone contained in the UIZ and the sensor node SN6 having the sensing zone partially included in the UIZ.

Hereinafter, it is assumed that the sensor node SN6 transmits only sensed data to the cluster node CN3, and the cluster node CN4 receives data from the sensor nodes SN10, SN11, SN13, SN14, and SN15, and the cluster node CN3 and transmits the received data to another cluster node or the access node.

In an exemplary implementation of the present invention, the sensor node SN6 stores data sensed in the sensing zone, and determines whether the sensing zone is overlapped with the UIZ 401 based on a GGC extracted from the user query to indicate the UIZ and another GGC stored in the node. As a result of the determination, a portion 420 of the sensing zone of the sensor node SN6 is overlapped with the UIZ and thus the overlapping area is calculated by using Equation 2 above, and the number of data transmissions is calculated by using Equation 3 above.

Figure 5:
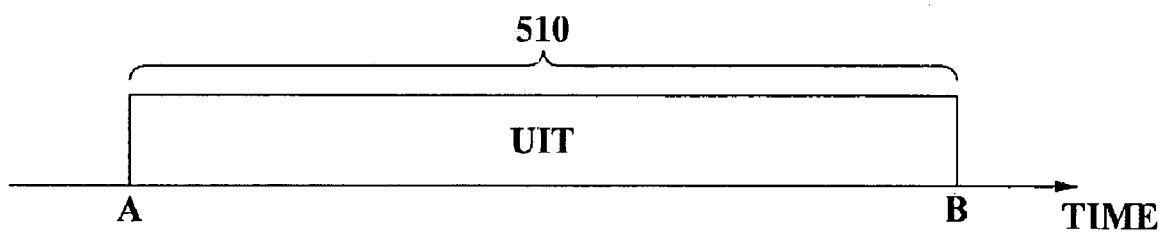
FIG. 5 illustrates an example of a user interest time (UIT) according to an exemplary embodiment of the present invention.

Also, as shown in FIG. 5, the sensor node SN6 transmits the sensed data to the cluster node CN3 by the determined number of data transmissions during a UIT 510 extracted from the user query, that is, during a period of time from time A to time B.

The cluster node CN4 stores data received from the sensor nodes SN10, SN11, SN13, SN14, and SN15, and the cluster node CN3, and selects data of nodes, having a zone overlapped with the UIZ, from the received data based on GGC information. In this instance, the GGC information is included in data received from each of the nodes. Specifically, the cluster node CN4 selects all data received from the nodes SN10, SN11, SN13, SN14, SN15, and CN3.

In an exemplary implementation of the present invention, each of the nodes SN10, SN11, SN13, SN14, SN15, and CN3 transmits the sensed data or the aggregated data to the cluster node CN4 at the number of data transmissions determined by the apparatus for determining the number of data transmissions according to the exemplary embodiment of the present invention.

The cluster node CN4 aggregates the selected data, calculates an overlapping area 410 between the UIZ and the sensing zone of the cluster node CN4, and determines the number of data transmissions by using Equation 3 above.

Also, the cluster node CN4 transmits the aggregated data to another cluster node or the access node by the determined number of data transmissions during the UIT 510 extracted from the user query.

Figure 6:
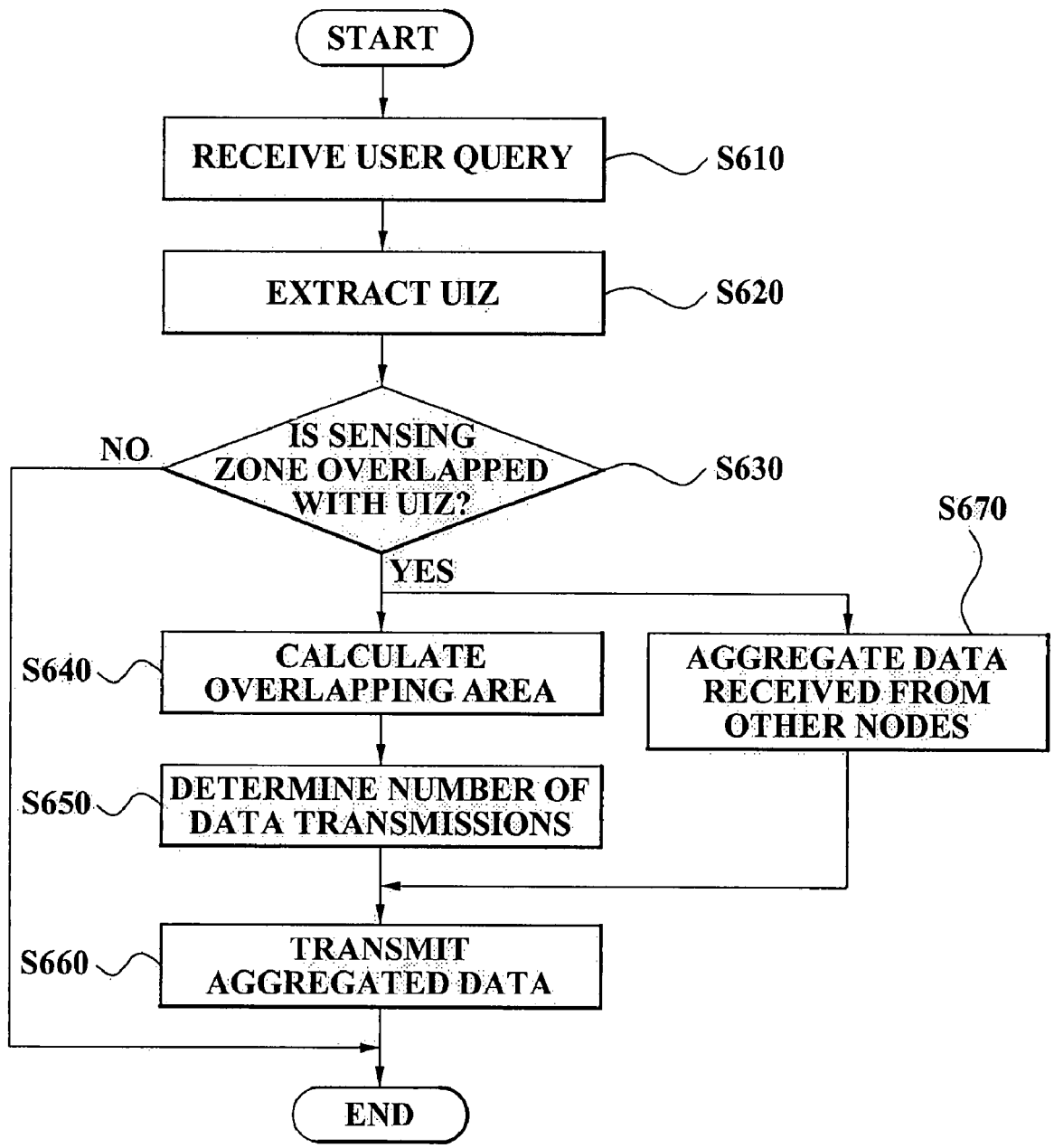
FIG. 6 is a flowchart illustrating a method of determining a number of data transmissions according to an exemplary embodiment of the present invention.

FIG. 6 is a flowchart illustrating a method of determining a number of data transmissions according to an exemplary embodiment of the present invention.

Referring to FIG. 6, in step S610, a user query is received. In step S620, a UIZ is extracted from the user query based on a GGC including an interest location and an interest range. In this instance, the GGC is included in the user query.

Also, the user query may include a UIT.

In step S630, when the UIZ is extracted, it is determined whether a sensing zone of a node is overlapped with the UIZ.

In an exemplary implementation, it is possible to determine whether the sensing zone is overlapped with the UIZ based on the GGC including the interest location and the interest range, and another GGC including a sensing location and a sensing range.

Also, it is possible to determine whether the sensing zone is overlapped with the UIZ by using a radius of the UIZ, a radius of the sensing zone, and a distance between the sensing location and the interest location.

Specifically, whether the sensing zone is overlapped with the UIZ may be determined by using Equation 1 above.

In step S640, when the sensing zone is overlapped with the UIZ as a result of the determination in step S630, an overlapping area between the UIZ and the sensing zone is calculated.

According to an exemplary implementation of the present invention, when the sensing zone is contained in the UIZ or inscribed in the UIZ, the overlapping area corresponds to the area of the sensing zone. Also, when the sensing zone is partially overlapped with the UIZ, the overlapping area may be calculated by using Equation 2 above.

In step S650, when the overlapping area is calculated, a number of data transmissions is determined based on the calculated overlapping area.

According to an exemplary implementation of the present invention, the number of data transmissions may be determined based on Equation 3 above.

In step S670, when the sensing zone is overlapped with the UIZ as a result of the determination in step S630, data received from other nodes are aggregated.

The aggregated data may include the data received from the other nodes and the data sensed in the sensing zone.

Also, the aggregated data may include data of nodes having a sensing zone overlapped with the UIZ, among the data received from the other nodes.

In step S660, when the data is aggregated and the number of data transmissions is determined, the aggregated data is transmitted by the number of data transmissions during the UIT included in the user query.

Also, the aggregated data may be transmitted to any one of a sensor node, a cluster node, and an access node.

Although steps S640, S650, and S670 are configured to be performed in parallel in FIG. 6, step S670 may be performed prior to step S640. Also, step S670 may be performed after step S650. Specifically, operational sequences of steps S640, S650, and S670 may be changed depending upon a state.

Figure 7:
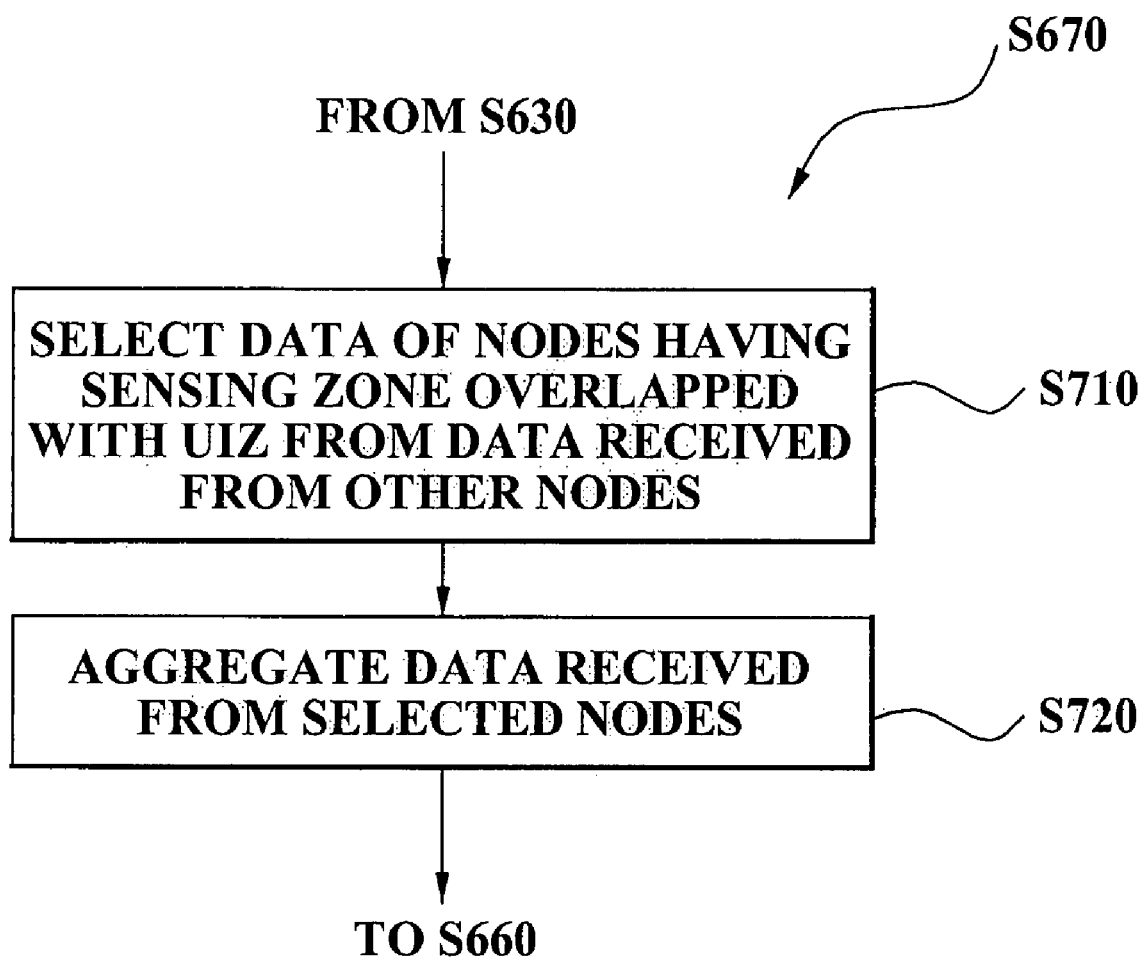
FIG. 7 is a flowchart illustrating an operation of aggregating data shown in FIG. 6 in detail.

FIG. 7 is a flowchart illustrating step S670 shown in FIG. 6 in further detail.

Referring to FIG. 7, in step S670, step S710 of aggregating the data selects data of nodes having the sensing zone overlapped with the UIZ from data received from other nodes.

According to an exemplary implementation of the present invention, the data received from other nodes includes a GGC of a node which transmits the data. Accordingly, it is possible to determine whether the sensing zone of each of the nodes is overlapped with the UIZ through a comparison between the GGC included in the data and the GGC of the UIZ, and thereby select data of nodes.

Specifically, overlapping of the sensing zone with the UIZ is determined by using a sensing location and sensing range, which are included in the GGC of each of the nodes, and an interest location and interest range of the UIZ.

In step S720, using the data of the selected nodes having the sensing zone overlapped with the UIZ, preferably only data received from the selected nodes is aggregated among the data received from the other nodes.

The method of determining the number of data transmissions according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The computer-readable recording medium can also be distributed over network-coupled computer systems so that the computer-readable code is stored and executed in a distributed fashion. The described hardware devices may be configured to act as one or more software modules in order to perform the operations of the above-described exemplary embodiments of the present invention.

According to exemplary embodiments of the present invention, it is possible to reduce a number of unnecessary data transmissions in a node and thereby reduce unnecessary power consumption.

Also, according to exemplary embodiments of the present invention, it is possible to reduce a number of unnecessary data transmissions in a node and thereby reduce a total number of data transmissions in a sensor network.

Also, according to exemplary embodiments of the present invention, it is possible to aggregate only data of nodes having a sensing zone overlapped with a user interest zone.

Also, according to exemplary embodiments of the present invention, it is possible to simply compare geographical codes and thereby determine whether a sensing zone is overlapped with a user interest zone.

While the invention has shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. An apparatus for determining a reduced number of necessary data transmissions used by one or more nodes in a sensor network comprising a plurality of zones, the apparatus comprising:
    an interest zone detector for detecting an interest zone based on a user query;
    a zone determination unit for determining whether the interest zone is overlapped with a sensing zone;
    a zone calculator for calculating an overlap amount when the interest zone is overlapped with the sensing zone by calculating the area ratio of the interest zone to an overlapping area between the interest zone and the sensing zone; and
    a transmission number determination unit for determining a reduced number of necessary data transmissions according to the overlap amount.

2. The apparatus of claim 1, wherein the zone determination unit determines whether the interest zone is overlapped with the sensing zone based on a geographical code comprising a sensing location and a sensing range, and another geographical code comprising an interest location and an interest range that are provided in the user query.

3. The apparatus of claim 2, wherein the zone determination unit determines whether the interest zone is overlapped with the sensing zone by using a radius of the interest zone, a radius of the sensing zone, and a distance between the sensing location and the interest location.

4. The apparatus of claim 3, wherein the zone determination unit determines that the interest zone is overlapped with the sensing zone in the case of at least $$\text{or } \begin{cases} r_1 - r_2 < d < r_1 + r_2 \\ r_1 - r_2 \geq d \end{cases}$$

where r1 indicates the radius of the interest zone, r2 indicates the radius of the sensing zone, and d indicates the distance between the sensing location and the interest location.

5. The apparatus of claim 1, wherein the interest zone and the sensing zone are formed in a circular shape.

6. The apparatus of claim 1, wherein the transmission number determination unit determines the reduced number of necessary data transmissions by $$T_n = \frac{S'}{S} \times \frac{UIT}{P_t}$$

where $T_n$ indicates the reduced number of necessary data transmissions, S' indicates an overlapping area between the interest zone and the sensing zone, S indicates an area of the interest zone, UIT indicates a user interest time comprised in the user query, and $P_t$ indicates a data transmission period.

7. The apparatus of claim 1, further comprising:
a data aggregator for aggregating data received from at least one node,
wherein the transmission number determination unit determines the aggregated number of data transmissions.

8. The apparatus of claim 7, wherein the data aggregator aggregates data sensed in the sensing zone.

9. The apparatus of claim 7, further comprising:
a data selector for selecting data, received from other nodes, from the data received from the at least one node, the other nodes having the sensing zone overlapped with the interest zone,
wherein the data aggregator aggregates the selected data.

10. The apparatus of claim 9, wherein the data selector further selects data sensed in the sensing zone.

11. A method of determining a reduced number of necessary data transmissions used by one or more nodes in a sensor network comprising a plurality of zones, the method comprising:
detecting an interest zone based on a user query;
determining whether the interest zone is overlapped with a sensing zone;
calculating an overlap amount when the interest zone is overlapped with the sensing zone by calculating the area ratio of the interest zone to an overlapping area between the interest zone and the sensing zone; and
determining a reduced number of necessary data transmissions according to the overlap amount.

12. The method of claim 11, wherein the determining whether the interest zone is overlapped with a sensing zone comprises:
determining whether the interest zone is overlapped with the sensing zone based on a geographical code comprising a sensing location and a sensing range, and another geographical code comprising an interest location and an interest range that are provided in the user query.

13. The method of claim 12, wherein the determining whether the interest zone is overlapped with a sensing zone comprises:
determining whether the interest zone is overlapped with the sensing zone by using a radius of the interest zone, a radius of the sensing zone, and a distance between the sensing location and the interest location.

14. The method of claim 13, wherein the determining whether the interest zone is overlapped with a sensing zone comprises:
determining that the interest zone is overlapped with the sensing zone in the case of at least $$\text{or } \begin{cases} r_1 - r_2 < d < r_1 + r_2 \\ r_1 - r_2 \geq d \end{cases}$$

where r1 indicates the radius of the interest zone, r2 indicates the radius of the sensing zone, and d indicates the distance between the sensing location and the interest location.

15. The method of claim 11, wherein the interest zone and the sensing zone are formed in a circular shape.

16. The method of claim 11, wherein the determining of the number of data transmissions comprises:
determining the reduced number of necessary data transmissions by $$T_n = \frac{S'}{S} \times \frac{UIT}{P_t}$$

where $T_n$ indicates the reduced number of necessary data transmissions, S' indicates an overlapping area between the interest zone and the sensing zone, S indicates an area of the interest zone, UIT indicates a user interest time comprised in the user query, and $P_t$ indicates a data transmission period.

17. The method of claim 11, further comprising:
aggregating data received from at least one different node,
wherein the determining of the number of data transmissions comprises:
determining the aggregated number of data transmissions.

18. The method of claim 17, wherein the aggregating comprises:
aggregating data sensed in the sensing zone.

19. The method of claim 17, further comprising:
selecting data, received from other nodes, from among the data received from the at least one node, the other nodes having the sensing zone overlapped with the interest zone,
wherein the aggregating aggregates the selected data.

20. The method of claim 19, wherein the selecting comprises further selecting the data sensed in the sensing zone.

21. A computer-readable recording medium having stored thereon computer executable instructions for implementing a method of determining a reduced number of necessary data transmissions used by one or more nodes in a sensor network, the instructions comprising:
a first set of instructions for detecting an interest zone based on a user query;
a second set of instructions for determining whether the interest zone is overlapped with a sensing zone;
a third set of instructions for calculating an overlap amount when the interest zone is overlapped with the sensing zone by calculating the area ratio of the interest zone to an overlapping area between the interest zone and the sensing zone; and
a fourth set of instructions for determining a reduced number of necessary data transmissions according to the overlap amount.

* * * * *